United States Patent

[11] 3,598,225

| [72] | Inventor | Lee Merrick |
| | | Wellsville, N.Y. |
| [21] | Appl. No. | 817,259 |
| [22] | Filed | Apr. 10, 1969 |
| [45] | Patented | Aug. 10, 1971 |
| [73] | Assignee | The Air Preheater Company, Inc. |
| | | Wellsville, N.Y. |

[54] ACCUMULATING CONVEYOR
4 Claims, 4 Drawing Figs.

| [52] | U.S. Cl. | 198/127 |
| [51] | Int. Cl. | B65g 13/02 |
| [50] | Field of Search | 198/127 |

[56] References Cited
UNITED STATES PATENTS

| 1,967,747 | 7/1934 | Eggleston | 198/127 |
| 3,156,345 | 10/1964 | De Good | 198/127 |
| 3,225,893 | 12/1965 | Currie | 198/127 |
| 3,323,636 | 6/1967 | Gotham | 198/127 |

*Primary Examiner*—Richard E. Aegerter
*Attorneys*—Wayne H. Lang and Eldon H. Luther ABSTRACT: A roller conveyor of the accumulation type by which articles such as cartons to be conveyed from one place to another are supported on driven rollers. The articles on the rollers being so moved from one location to another are subject to stoppage or intermittent movement on the surface of the conveyor without causing congestion and pileup of such articles which might effect their jamming and breakage.

PATENTED AUG 10 1971
3,598,225
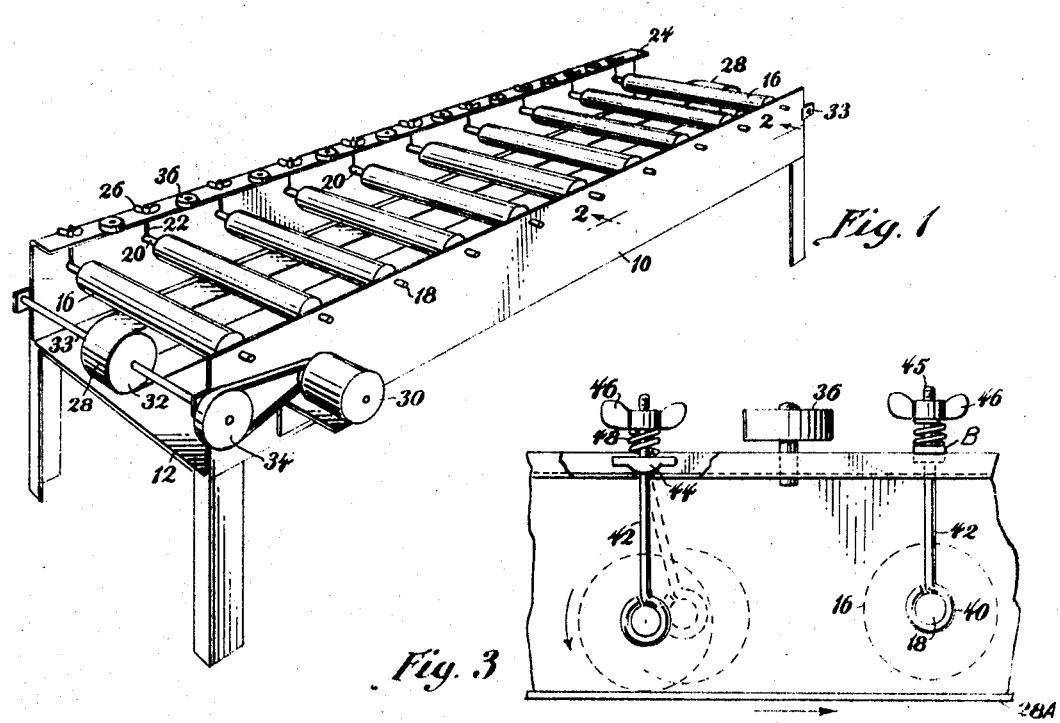
Fig. 1
Fig. 3
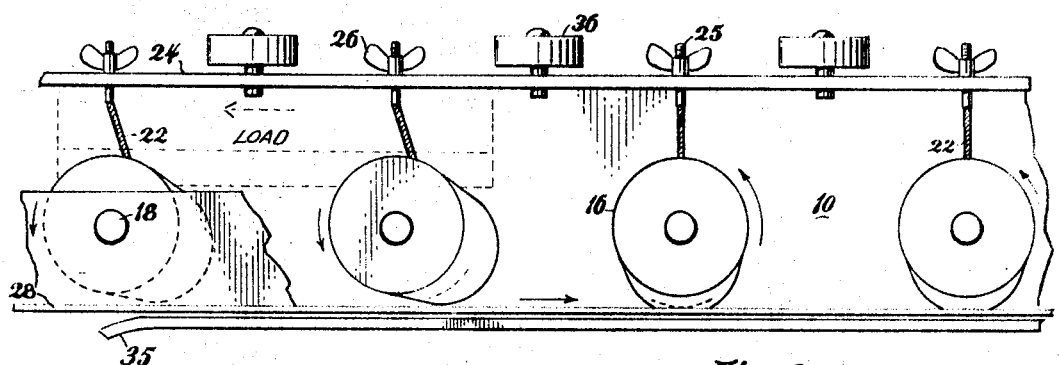
Fig. 2
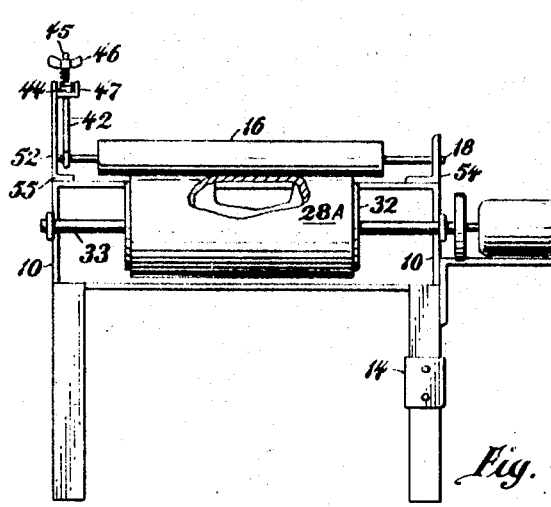
Fig. 4
INVENTOR.
Lee Merrick
BY Wayne H. Lang
AGENT

ACCUMULATING CONVEYOR

BACKGROUND OF THE INVENTION

1. Field of the Invention

This invention relates generally to a live-roller conveyor of the accumulation type.

2. Description of Prior Art

In conveyors used for moving articles from one location to another it has become virtually necessary that such conveyors be arranged to permit the accumulation and stoppage of said articles on the surface of the conveyor in an orderly manner.

To this end various patents such as those represented by U.S. Pat. No. 3,176,828 and No. 3,255,865 have been developed to provide an arrangement by which the force driving the conveyor is reduced or removed entirely when a congestion of articles thereon occurs or when normal movement of the articles is otherwise terminated.

In the prior art the accumulation devices are generally quite sensitive to specific conditions whereby such apparatus made to handle a certain size or type of article is completely unsatisfactory for use with material or a different size or shape. For example, apparatus designed to properly convey large cartons of heavy machinery would require completely different design from that required to convey small, light boxes of cereal. The apparatus of this invention would handle such objects interchangeably.

SUMMARY OF THE INVENTION

The present invention therefore relates to an accumulation conveyor by which articles supported thereon for moving from one location to another are subject to stoppage whereby such articles may freely accumulate on the conveyor without causing their jamming or pileup and possible breakage.

The invention also includes an arrangement by which articles being conveyed thereby will remain orderly and in a substantially even course on the surface of the conveyor. Moreover, the conveyor of this invention is adapted to provide these advantages by means of a relatively simple arrangement made at a reasonable expense of time, effort and material to thus avoid the usual complex design.

It is therefore an objective of the present invention to provide an accumulation conveyor of this type suitable for a variety of different loads.

It is another objective of the invention to provide a conveyor having the ability to maintain the material being conveyed in an orderly manner.

It is yet another objective of the present invention to maintain the power needed for motivation at a minimum.

It is also in objective of this invention to provide an arrangement of the type described which may readily be added to existing "slider"-type conveyors.

It is a further objective of the present invention to provide an accumulation device which will effectively operate equally well when moved forward or in reverse.

It is another objective of my invention to provide a device having a nearly instantaneous response to material stoppage in that stoppage of material flow will quickly stop the machine.

It is still another objective of the present invention to provide an accumulation device that can be readily altered to provide increased or decreased capacity.

As indicated above these and other objectives of the present invention are accomplished effectively by the apparatus to be defined in the accompanying specifications and shown in the accompanying drawings in which:

FIG. 1 is a perspective view of a conveyor embodying the invention,

FIG. 2 is a diagrammatic representation of the principle of operation of the above device, FIG. 3 shows a modified form of the device wherein the rollers are suspended on pivoted rods, and FIG. 4 is a diagrammatic representation of the device shown in FIG. 3.

With reference to the drawings there is shown a conveyor which comprises a frame having a pair of longitudinal side plates 10 at the lateral sides of a transverse member 12 supported by legs 14.

Between longitudinally disposed frame members 10 there are provided a series of transverse article supporting rollers 16 which are supported at one side by an axle 18 traversing an opening in the frame 10 while the opposite end 20 of each roller 16 is free to move arcuately about a center which lies directly above the lowermost position of the roller on or adjacent the flange 24. The end of the roller is preferably suspended by a flexible steel cable 22 which depends from the flange 24 of the frame 10. A threaded member 25 is secured to the end of the cable 22 where it traverses an opening in the flange 24 to enable a suitable adjusting means such as thumb screw 26 attached to the end of cable 22 acting against the flange 24 to raise or lower the subjacent end of the roller into the desired degree of contact with an endless driving member.

The rollers 16 are driven by frictional contact with the endless driving member which is illustrated in the drawings as a belt 28. This belt may pass around suitable supporting drums 32 on shafts 33 journaled in the frame 10 at opposite ends of the conveyor and supported at intermediate points by a transverse bed 35 carried by lateral sides of the frame so that the upper run of the belt contacts in an engaging relationship the lower periphery of the rollers 16.

The belt 28 is driven in either direction by a motor 30 and transmission means 34. If driven as shown in FIG. 1, the upper run of the belt will travel to the right and the engaging rollers 16 will travel in a counterclockwise direction so as to move articles on the rollers to the left in a direction opposite to the direction of the movement of the upper run of the belt. Reversal of the motor 30 is all that is required to reverse movement of articles carried by the conveyor.

By adjustably turning the thumb screws 26 on cable 22 at the end of each roller 16, a particular roller may be raised or lowered as required to provide an optimum driving pressure on the belt 28. Thus the rollers 16 may be each vertically adjusted to lightly contact or "kiss" the belt in order that they may be positively rotated in a direction dependent upon movement of the belt 28 driven by motor 30 through transmission means 33.

When an article on the surface of the conveyor is slowed or completely stopped by a force sufficient to overcome the frictional contact between the rolls 16 and the load carried thereby, the rollers 16 cease to rotate in their bearings. However, the frictional contact with the moving belt 28 slightly moves the entire roller arcuately about the pivot point on flange 24 from which it is suspended. Thus when forward movement of the load is stopped the roller no longer rotates but the entire roller moves arcuately around a point on flange 24 as a center of rotation. The roller thus moves away from the horizontal belt 28 so that the frictional contact therewith decreases accordingly until it is terminated and no significant rotational force is imparted to the individual rollers 16.

When the obstruction to forward movement of the articles on the surface of the conveyor has been removed so that the load may move forward in an orderly manner, the rolls 16 fall back onto the belt 28 and again are rotated as formerly by the frictional contact therewith so that the load on the upper surface of the conveyor may move forward in a normal manner.

The rollers 16 of the conveyor may be inclined from a horizontal position as shown in FIG. 1 whereby one longitudinal side thereof is substantially lower than the other and articles thereon will be forced by gravity down the inclined rollers against the support flange 24. To reduce frictional drag between the elevated side of the flange 24 and the moving load, antifriction skate-wheels 36 are mounted on the frame to comprise a friction-free bearing above a plane tangent to the upper face of the rollers 16. Thus, articles being conveyed on the slightly inclined surface of the conveyor gravitate toward the lower side thereof until they contact the friction-free barrier wheels 36 and are then moved along in an orderly manner.

In a modified form of the apparatus shown in FIG. 3 of the drawing the rollers 16 comprising the movable bed of the conveyor are suspended at one end from flange 47 by rigid eyebolts 42. The opposite end 18 of each roller 16 is usually supported in a fixed support in the frame although it is possible to obtain greater sensitivity of the conveyor to material stoppage if both ends of the roller 16 are similarly suspended from an elevated support means in a manner not illustrated.

The "eye" 40 of each eyebolt 42 is adapted to receive the axle 18 of rollers 16 while the upper end of each eyebolt 42 loosely traverses an opening in the flange 35 and an arcuate rocker member 44 to terminate in a threaded end 45 on which is secured a common wing nut 46. The point of contact between the rocker member 44 and the flange 24 thus comprises the pivot point for the eyebolt 42 depending therefrom. A compression spring 48 around the eyebolt intermediate the wing nut 46 and the rocker member 44 biases the members 44 and 46 apart. Inasmuch as the compression spring 48 bears directly upon the wing nut 46 it may be rotated to compress the spring and place an increased bias upon the spring. As the bias upon the spring is increased it increasingly biases upward the eyebolt 42 and the roller 16 carried thereby. By adjustably rotating the nut 46 the weight of the rollers 16 may be counterbalanced by the upward force of the spring until each roller may be raised out of contact with the moving belt 28, and only when the additional weight of a load upon the upper surface of the rollers is sufficient to counterbalance the force of the compressed spring and force the roller down into contact with the belt 28 is there any movement thereof.

Thus the conveyor rollers 16 remain inactive until a load of predetermined weight is moved on to the upper surface thereof and the rollers are forced into contact with the belt 28. Inasmuch as the rollers are inactive a significant portion of the time their useful life is accordingly increased.

The arrangement above defined may be easily added to existing "slider" conveyors in the manner shown by FIG. 4, it only being necessary to install a series of independent rollers 16 above the "slider" belt 28 each of which may be adjustably elevated to "kiss" the belt 28-A and be rotated in response to frictional contact therewith.

An angle 52 is accordingly placed on one side of flange 53 along the edge of frame 10 and secured thereto as by spot-welding at a number of spaced points. An angle 54 ported to receive the rotatable axis of roller 16 is similarly joined to the opposite side of the "slider" conveyor frame 10. The vertical flange of the channel 52 is bonded to a horizontal flange 35 which is ported to loosely receive the eyebolt 42 in the manner previously defined.

Should it be desired to utilize the conveyor as a standard gravity type conveyor wherein the rollers 16 have no contact with the driving means 28, the rollers 16 may be easily raised out of contact with the belt 28.

In the device of FIG. 1 the rollers 16 may be raised from contact with the belt 28 by turning the adjusting means on the end of tension member 22. Similarly in FIG. 3 adjusting the wing nuts 46 on eyebolts 42 will raise the rollers 16 from contact with the belt 28. A quick release from contact of the rollers 16 with the belt 28 may also be achieved by simply raising the rocker members 44, turning them 90° and allowing the ears 56 thereof to rest upon the elevated sides of the members 35 and 52 in the manner shown at "B" of FIG. 3.

From the foregoing description it is apparent that this invention provides for an accumulation conveyor which operates in accordance with a load stoppage condition sensed by the same conveyor rollers which underlie and carry the load.

It is understood that the specific construction disclosed herein is presented for the purpose of explanation and illustration and it is not intended to indicate limits of the invention, the scope of which is defined only by the following appended claims.

I claim:

1. An accumulation conveyor comprising in combination a frame, plurality of transversely disposed rollers mounted on said frame to form a composite surface for the movement of a load longitudinally along said frame, a flexible drive member having an upper run in frictional engagement with the lower surface of said rollers, means for moving said flexible drive member longitudinally along said frame to rotate the rollers in contact therewith, and releasable clutch means moving the rollers out of contact with the flexible drive member providing intermittent driving contact between the lower surface of said rollers and the flexible drive member, said clutch means comprising elongate tension members having an upper end supported by a side of said frame and a lower end carrying an end of the rollers which lie in contact with the flexible drive member whereby frictional engagement between the flexible member and said rollers causes said tension members to swing radially about the support on said frame thus moving the rollers out of contact with the flexible drive member when longitudinal movement of the load carried on the upper surface of the rollers is terminated.

2. An accumulation conveyor comprising a plurality of parallel roller means as defined in claim 1 wherein the clutch means releasably holding said rollers in contact with the belt comprises a pivotally held suspension means secured to an end of said roller and arcuately movable in the direction of movement of said power supply belt.

3. An accumulation conveyor comprising a plurality of parallel roller means as defined in claim 1 wherein the clutch means releasably holding said rollers in contact with the power supply belt is positioned at one end of said rollers while the opposite ends thereof are permanently mounted in said frame.

4. An accumulation conveyor as defined in claim 1 wherein the upper run of the endless drive member is substantially tangent to the transversely disposed rollers when said rollers are positioned at the lowermost portion of their arcuate support.